Patented Feb. 17, 1942

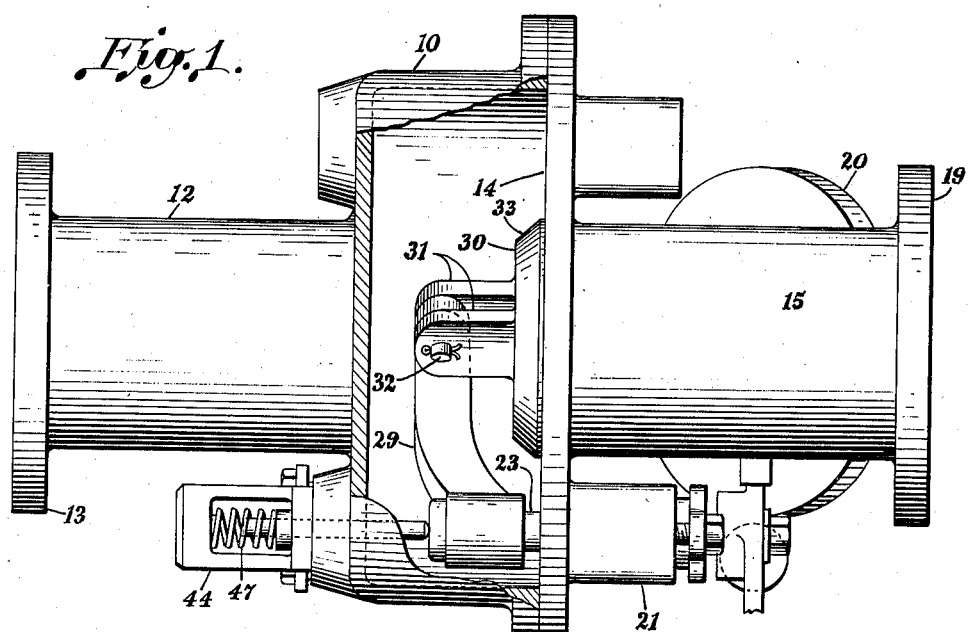

2,273,720

UNITED STATES PATENT OFFICE 2,273,720

VALVE

Joseph H. Morrow, Hokendauqua, Pa., assignor to Fuller Company, Catasauqua, Pa., a corporation of Delaware Application February 28, 1941, Serial No. 381,029

1 Claim. (Cl. 251—18)

This invention relates to valves and more particularly to valves of the type in which a valve disc is slidable to open or close one or more ports provided in a flat seat. It is especially concerned with a valve for use in pipe lines carrying pulverulent materials in suspension in or in the presence of fluids under substantial pressure, examples of which are materials, such as Portland cement, pulverized coal and limestone, conveyed in an aerated condition or in suspension in air, and slurries of cement raw materials and other materials in suspension in water as slips, sludges or slurries.

The invention constitutes an improvement of that of the patent to Kinter et al. 1,394,738, which is commonly used for the purposes described, in that positive means are provided to maintain the disc in proper sealed contact with the seat under the severe operating conditions to which these valves are subjected, to prevent leakage and resulting rapid and progressive wear that necessarily follows.

Although, in new or properly adjusted valves of the patented type, the disc may be firmly pressed against the seat to prevent leakage into the covered port, a tight seal, especially against leakage of compressed air, is difficult to maintain. When hot, abrasive materials, such as freshly ground Portland cement, are conveyed through a valve, the development of leakage paths is especially rapid, due to several causes in addition to the normal wear of the relatively moving parts in the presence of abrasive dust. These include clearances resulting from changes in temperature of the parts, and accumulations of hardened cement on the surfaces of the seat, which tend to lift the disc from the seat as it is moved. The accumulations of hardened material on the flat surface of the seat results from the condensation of moisture from the heated air in the system, when the latter cools during idle periods. In the absence of positive means to maintain the disc in engagement with the seat, these accumulations are not fully scraped from the seat, with the result that leakage paths are developed.

When these leakage paths are formed, the abrasive dust particles travelling at high velocity, cut grooves into the metal, i. e. the metal is "wire-drawn," and, as will be realized, wear and leakage then progress rapidly.

Various attempts have been made heretofore to maintain the proper seal between the valve disc and the seat under varying conditions of wear and heat changes. In one form of the prior art construction the valve disc is carried loosely in the operating arm, and a spring positioned between the operating arm and the disc acts to keep the disc and seat in proper sliding contact, but this construction has proved to be unsatisfactory for a number of reasons, the most important of which is the loss of life of the spring due to constant heat variations caused by the material passing through the valve. A further disadvantage of this construction, when used in a line through which fine material such as cement or coal in pulverulent condition is conveyed, is the ability of the fine material to pack and harden between the arm and valve disc. Under this condition, should an obstruction develop on the seat over which the valve disc must ride, the hardened cake, between the arm and valve disc, prevents relative movement, with the result that the arm is subjected to strains, at times resulting in a breaking of the arm.

The present invention is, accordingly, directed to the provision of a novel valve of the slidable disc type in which means are provided to properly seal the valve disc and seat, in which the port or ports are provided, under all conditions of wear and heat changes. The desired result is obtained by mounting the spindle, carrying the supporting arm for the valve disc, for longitudinal movement, and applying through suitable means a continuing pressure upon the end of the spindle tending to move it in a direction toward the seat, thus upon wear or heat changes of the relatively moving parts the spindle moves longitudinally and the valve disc is held tightly against the seat.

The new valve includes the usual housing having a tubular flanged member extending from one side for attachment to the main line, the interior of the housing constituting the valve chamber. A smooth valve seat closes the open end of the housing and has one or more openings therein from which extend separate tubular members adapted to be attached to the main line or main line and branch lines in a suitable manner. A spindle having one end extended into the housing at one side, supports the valve disc in proper relation to the seat, and suitable means are provided at the end of the spindle outside of the housing to rotate the spindle and thus move the disc to selectively open or close the desired opening. A packing gland is placed about the spindle at the point where it passes from the housing, this packing gland sealing the opening while permitting rotative and longitudinal movement of the spindle.

A pin having one end extending through an opening in the housing, opposite to and aligned with the opening through which the spindle extends, axially contacts the end of the spindle, and a spring located outside of the housing and held in operative position with the pin, exerts a continuing force thereon with the result that the valve disc is held tightly against the seat. Wear or changes due to heat are compensated for by the spring which, due to its location on the outside is not influenced by the material flowing through the valve.

For a better understanding of the invention, reference may be made to the accompanying drawing in which Fig. 1 is a side elevation of the valve with portions broken away for purposes of illustration.

Fig. 2 is a side elevation of the valve taken at right angles to the view shown in Fig. 1, parts being broken away for purpose of illustration.

Fig. 3 is a view taken on lines 3—3 of Fig. 1.

The valve illustrated in the drawing comprises a housing 10 having a flange 11 at one open end. A tubular member 12 extends from the other end of the housing and terminates in a flange 13 adapted to be connected to the main line of the system to be controlled. A face plate 14, closes the open end of the housing 10, this plate having a pair of separate tubular members 15 and 16, extending from one side, the tubular members terminating in a pair of associated openings 17 and 18 in the face of the plate. That portion of the plate surrounding the openings constitutes the valve seat. At the end opposite the plate, the tubular members have flanges 19 and 20 adapted to be connected to suitable lines.

A bearing housing 21, cast integral with the plate 14, has a bore 22 to receive the spindle 23 and collar 24, the outer portion of the bore being enlarged at 25 to receive packing members 26, to seal the shaft in the bore. A plate 27 adjustably held by screws 28 holds the packing in place and under the necessary pressure.

The spindle 23 at one end extends into the valve chamber and carries an integral arm 29. A valve disc 30 having a pair of integral lugs 31 is pivotally connected to the arm 29 by pin 32 which extends through suitable openings in the lugs and arm. From this construction it will be clear that rotation of the spindle will move the valve disc from one position to another to open or close the desired opening, the pivoted connection of the disc to the arm permitting the disc to assume the proper relationship to the face plate. The disc is beveled as at 33 to form a sharp peripheral edge to cut material from the face plate in its movement from one position to the other to cause the proper seating of the disc. Operating means 34 for rotating the spindle is connected to the end thereof, the operating means having divergent arms 35 and 36 and lugs 37 limit the position of the operating means in either of its two positions to properly locate the valve disc.

A thickened portion 38 of the housing 10 has an opening 39, the opening being positioned in axial alignment with the spindle when the valve is assembled. A rod 40 having a flange 41 near one end and a rounded portion 42 at the other end extends through the opening 39, and a packing gland 43 suitably seals the rod in the opening. A substantially U-shaped saddle 44 attached to the outer side of the housing as by screws 45 has its bail portion 46 aligned with the opening 39 and a spring 47 carried by the rod 40 and bearing against the flange 41 is compressed between said flange and the bail portion of the saddle to exert pressure on the rod in the direction of the spindle, thus the rounded portion of the rod bears axially of the spindle, with a continuing pressure.

It will thus be seen that for all positions of the valve disc a substantially constant pressure is exerted through the arm to force the disc into close association with the face plate, the spindle merely moving outwardly in the bearing to compensate for wear of the relatively moving parts. Periodic adjustment of the valve is eliminated by the new construction and maintenance costs are reduced to a minimum.

I claim:

In a slidable valve having a chamber provided with a plane inner surface through which is formed at least one port, the surface acting as a valve seat, the combination of a flat valve disc lying against said seat, a spindle extending into the chamber through a wall thereof at one side of and at right angles to the plane of said seat, an arm rigidly secured to the spindle and connected to the disc, means for rotating the spindle to cause the arm to move the valve over the seat to open and close the port, a rod extending through a wall of the chamber in axial alignment with the spindle, the rod having a rounded end bearing on the spindle, a collar on the rod outside the chamber and spaced from the chamber wall, a spring encircling the exposed end of the rod beyond the collar and bearing at one end against the collar, a member secured to the chamber wall, the spring bearing at its other end against the member, and a packing gland sealing the rod in the opening in the chamber wall.

JOSEPH H. MORROW.